June 9, 1931. J. W. HOEFLING ET AL 1,809,701
GRAIN CLEANING AND SEED TREATING APPARATUS
Filed May 7, 1929 4 Sheets-Sheet 1
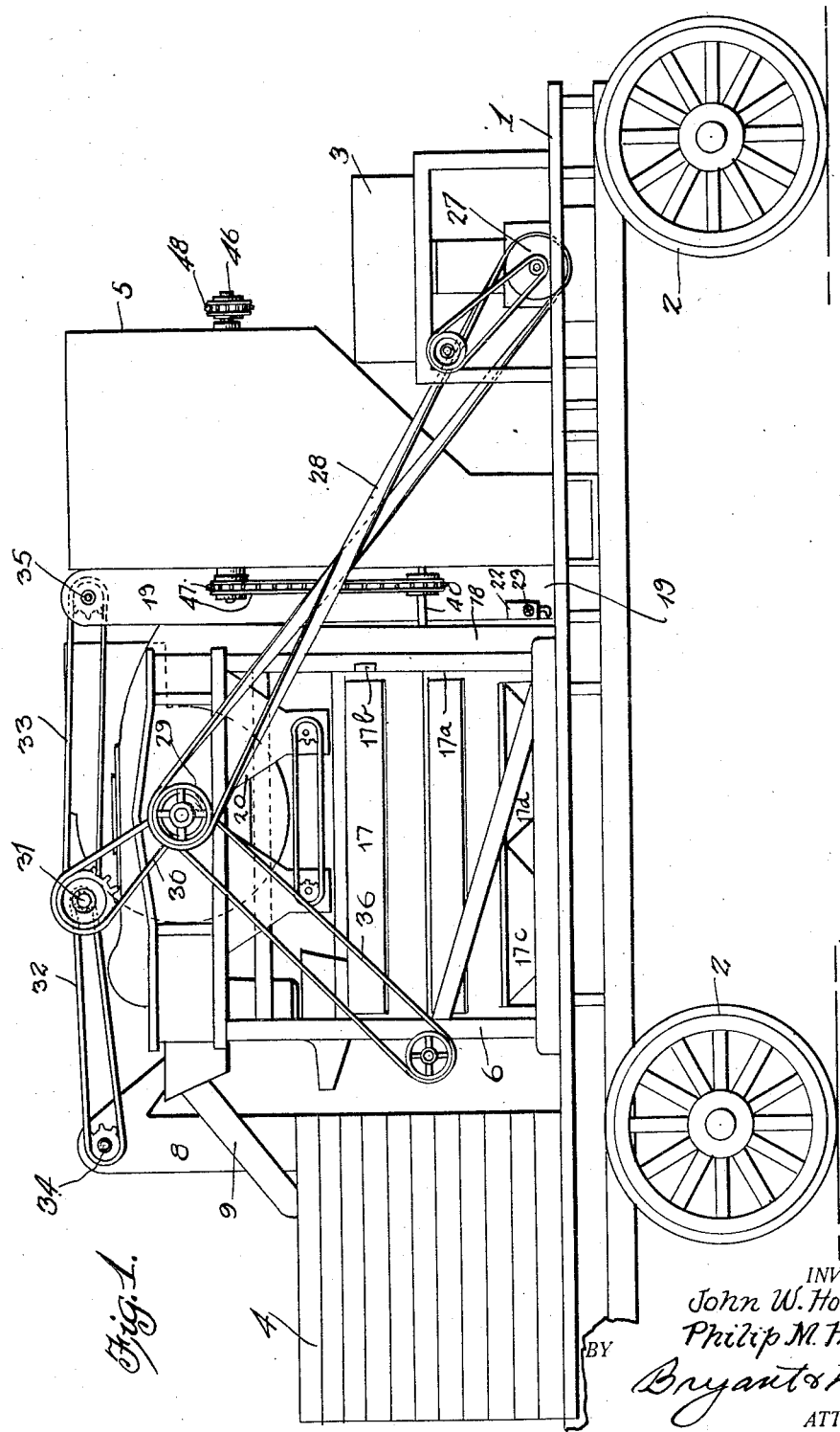
INVENTORS.
John W. Hoefling &
Philip M. Hoefling,
BY Bryant & Lowry
ATTORNEYS

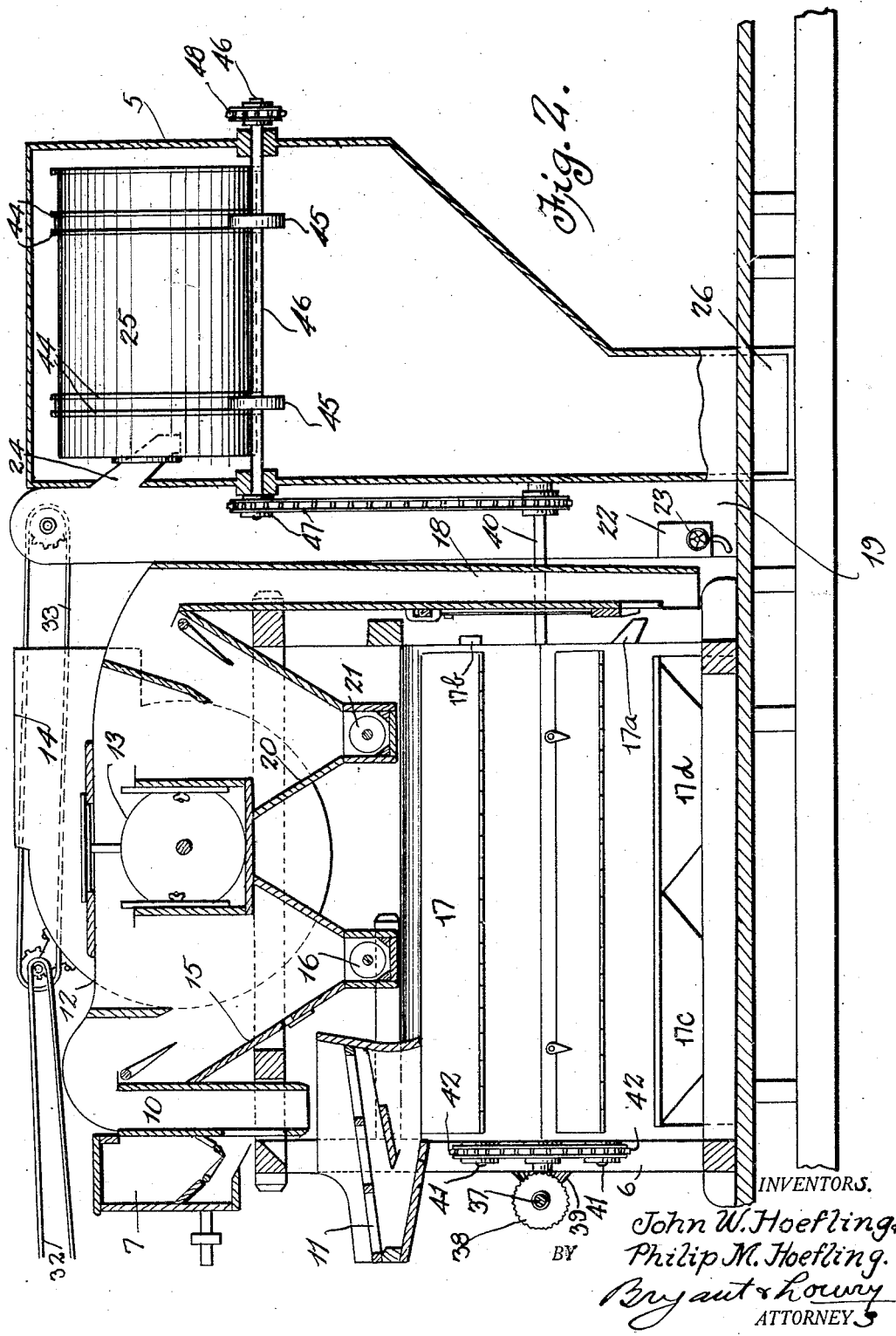

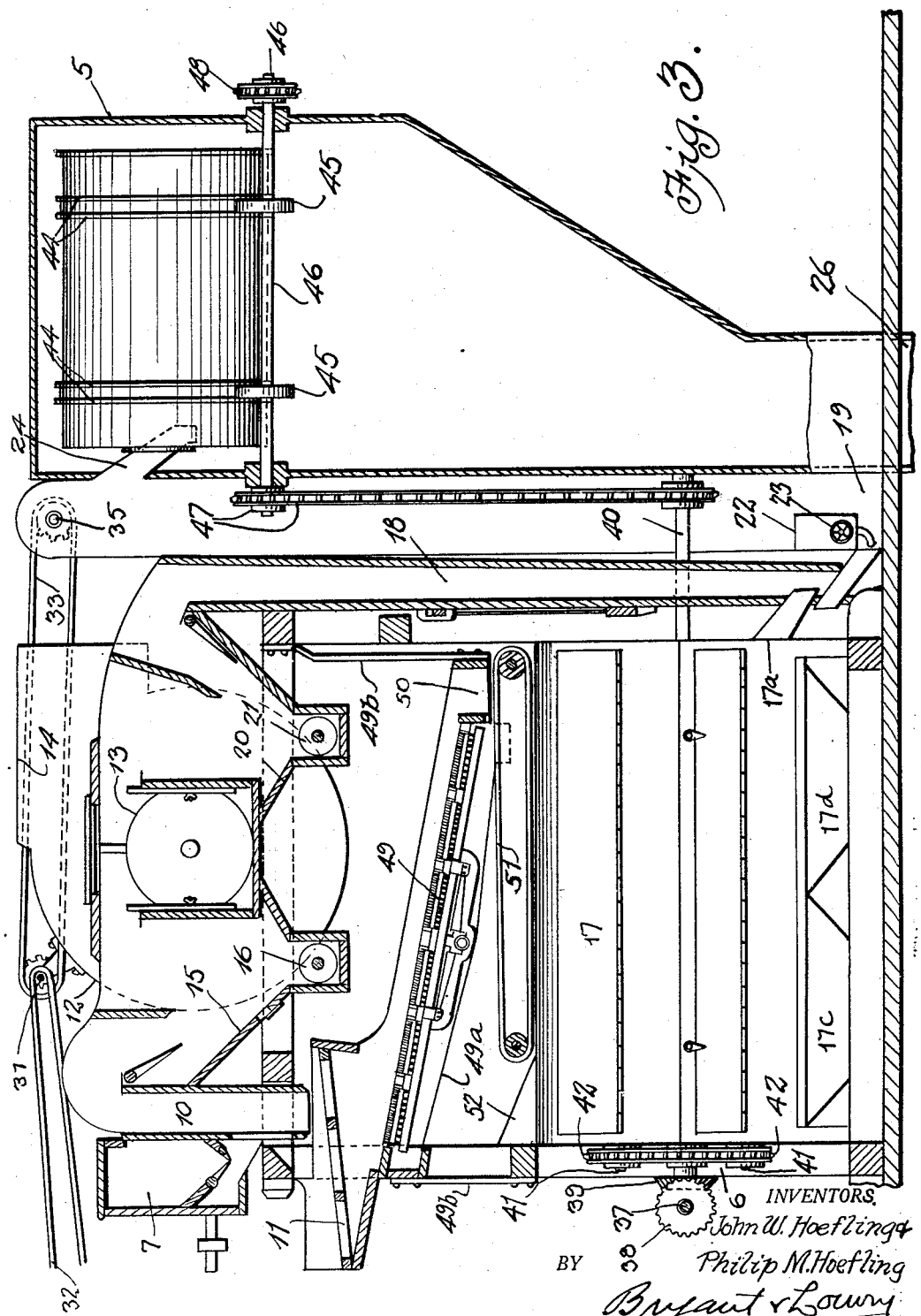

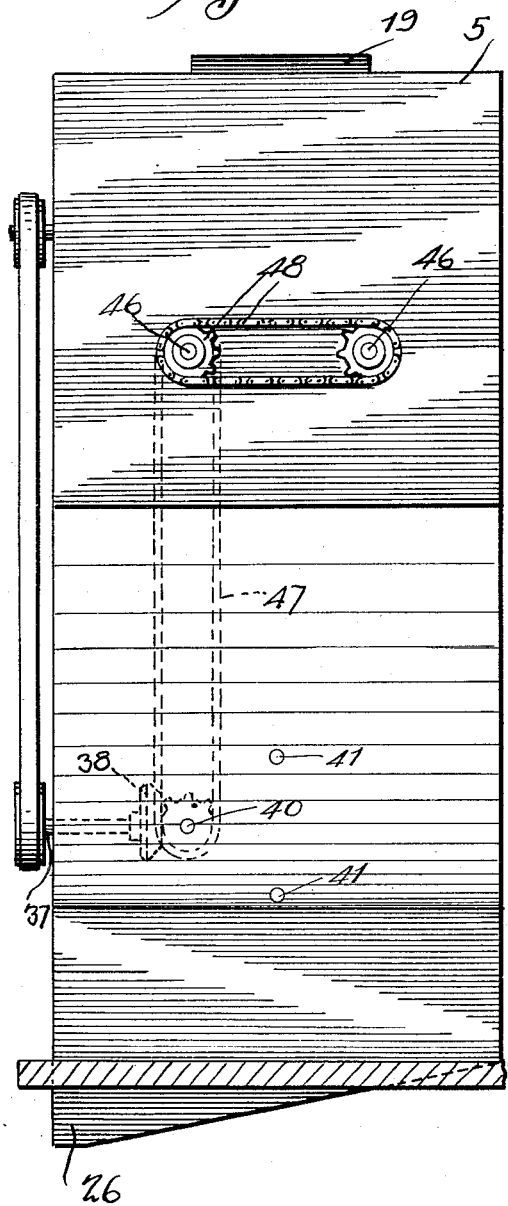
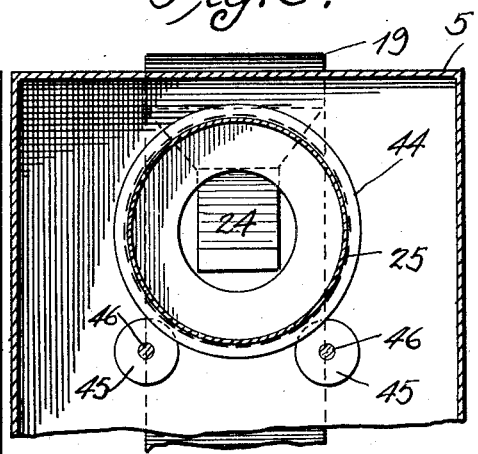
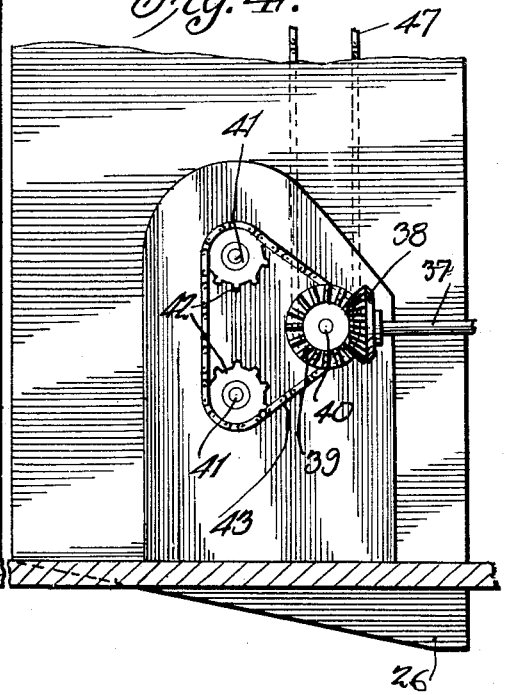

Patented June 9, 1931

1,809,701

UNITED STATES PATENT OFFICE

JOHN W. HOEFLING AND PHILIP M. HOEFLING, OF CHICO, CALIFORNIA

GRAIN CLEANING AND SEED TREATING APPARATUS

Application filed May 7, 1929. Serial No. 361,120.

This invention relates to certain new and useful improvements in grain cleaning and seed treating apparatus particularly as regards portable apparatus and has special reference to the cleaning and treating of wheat, the wheat in travelling through the apparatus first being operated upon by a suction action, then having large seed, such as barley and oats removed, then small sized seed with broken wheat and the usual screenings separated, then a second suction action and finally a smut-preventive treatment.

It should be noted here that the word "cleaning" when referring to grain is used in this specification to mean separation from foreign material.

Another object of the invention is to provide portable wheat cleaning and treating apparatus with suction devices disposed in proximity of the seed feeding and exit point of the cleaning and treating apparatus with a disk type separator disposed beneath the suction devices affective for the separation of foreign seeds from the wheat.

Another object of the invention is to provide grain cleaning and treating apparatus of the above type wherein both a combination of screening device and disk separator are used between the two suction legs, thus providing two aspirations, together with both diameter and length of kernel separations, simply and compactly.

A further object of the invention comprises an anti-smut treatment of the grain as delivered from the separating and screening apparatus by charging the grain with a predetermined amount of copper carborate or like substance with the grain delivered to a mixing barrel for agitation for final delivery into a hopper or receptacle at the outlet end of the apparatus for sacking or the like.

A further object is to be able to accomplish the foregoing objects in such a way as to make practical the portable mounting of a high standard, complete combination to be used for preparing grain for seed, moving from farm to farm rather than hauling the grain to and from a stationary outfit.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of the seed cleaning and treating apparatus portably mounted showing the combination of a double suction device and a disk separator;

Figure 2 is a fragmentary vertical longitudinal sectional view showing the double suction apparatus, the disk separator and the elevator for delivering the seed from the disk separator to the mixing drum for final discharge into a hopper or receptacle;

Figure 3 is a fragmentary vertical longitudinal sectional view similar to Figure 2 showing a vibrating screen interposed between the first suction leg and the disk separator;

Figure 4 is a detail elevational view, partly in section showing the driving mechanism for the double disk separator;

Figure 5 is an elevational view, partly in section showing the drive mechanism for the mixing barrel; and Figure 6 is a detail sectional view through the tumbler barrel and casing showing the barrel mounting and rotating means therefor.

The apparatus being especially designed for the treatment of wheat, although it may also be used for other grains with certain slight changes, the grain is first dumped into a hopper at the floor level of the machine and at the rear thereof where an elevator is employed for carrying it upwardly to the first stage of attack, or first suction, where all worthless light trash is removed, trapped and sacked. From the first suction, the grain drops to a grain separator where all separations by size of kernels are made, and such seeds as barley, oats, mustard, wild radish and morning glory are removed. The grain in outletting from the disk separator is acted upon by a second suction which is sufficiently strong to draw out cracked kernels, shriveled or light wheat and other foreign matter lighter than plump wheat. The clean wheat is then charged with a predetermined amount of copper carbonate for coating the wheat and is then conveyed by an elevator upwardly into a mixing barrel for complete agitation and final discharge into a hopper below it from which the same is delivered through a gate controlled outlet for purposes of sacking or otherwise.

The apparatus for carrying the above objects into operation comprises in a portable machine, a platform 1 mounted on ground wheels 2, the machine being driven by the motor 3. The rear end of the machine has a grain receiving bin 4 mounted on the platform 1, while the forward end of the platform supports a hopper 5 for the cleaned and treated wheat, the grain in the bin 4 passing through the several stages of treatment before final delivery into the hopper 5.

A firm structure 6 is mounted on the platform 1 between the bin 4 and hopper 5 and incloses a disk separator supported on the platform while suction apparatus is supported at its upper end. The suction apparatus is shown in Figure 2 and includes a grain receiving receptacle 7 charged through the medium of an elevator 8 operating from the lower end of the bin 4, the grain receptacle 7 having an overflow return pipe 9 leading to the bin 4 so that the receptacle 7 may be fully charged when the machine is in operation. The outlet from the feed receptacle 7 is valve controlled and grain is delivered therefrom into the first suction leg 10 that directs the grain onto the scalper screen 11. The suction apparatus supported at the uper end of the frame structure 6 includes a fan casing 12 having an axial inlet 13 and a tangential outlet 14, the suction leg 10 being in communication with the fan inlet 13. The light material initially removed from the grain while passing through the suction leg 10 falls by gravity into a pocket 15 with a screw conveyor 16 at its lower end for conveying the settlings therefrom. The grain is delivered through the scalper screen 11 into the disk separator 17, where separation by size of kernels are made, the separated wheat discharging from the disk separator at the outlet end 17a and flowing by way of the lower end of the tail suction leg 18 into a receptacle at the lower end of the elevator 19, while other separations are discharged at 17b, 17c and 17d. The suction in the leg 18 is sufficient to draw out the cracked kernels, shriveled and light wheat and any other matter lighter than plump wheat, the upper end of the tail suction leg 18 communicating with the receptacle 20 and fan inlet 13, while the conveyor 21 in the lower end of the receptacle 20 removes the settlings.

A receptacle 22 associated with the lower end of the elevator 19 and valve controlled as at 23 contains copper carbonate or other treating agent in powder form to be delivered to the wheat in predetermined quantities for coating the same for purposes well understood in this art, the elevator 19 raising the wheat with powder added for discharge through the spout 24 through the mixing barrel 25, located in the receiving hopper 5 for the cleaned and treated wheat, the lower end of the hopper 5 having a gate controlled outlet 26 from which the wheat may be sacked or otherwise handled.

The driving mechanism for the several movable parts is operatively engaged with the motor 3, the pulley 27 on the motor shaft having a belt connection 28 with the pulley 29 of the fan shaft. The fan shaft 29 has a belt connection 30 with the shaft 31 as shown in Figure 1 disposed above the suction apparatus and said shaft 31 has belt connections 32 and 33 with the top shafts 34 and 35 of the elevators 8 and 19 respectively. The mechanism described operates the suction fan and elevators.

The fan shaft 29 has a belt connection 36 with the stub shaft 37 shown in detail in Figure 4 having a bevel gear 38 upon one end meshing with the bevel gear 39 upon the shaft 40 that extends through the disk separator 17. The two shafts 41 of the disk separator, carry externally of the separator casing, sprocket wheels 42 inclosed by a sprocket chain 43 that also encloses a sprocket chain on the shaft 40 adjacent the bevel gear 39 for operating the two sets of disks of the separator.

As shown in Figures 2, 3, 5 and 6, the mixing barrel 25 has a pair of spaced track rails 44 adjacent each end between which supporting rollers 45 on the two shafts 46 extend, the shafts 46 being rotated to effect rotation of the tumbling barrel 25. One of the shafts 46 has a chain and sprocket connection 47 with the shaft 40 at the inner end of the hopper 5, while the two shafts 46 projecting through the outer end of the hopper 5 are connected by chain and sprocket mechanism 48.

The invention as above described consists of the combination of a single unit two leg suction apparatus and a disk separator, the modification shown in Figure 3, comprising a similar structure with the interposition of a vibrating screen 49 and a seed retaining pan 49a having an outlet at one end, the screen being supported by the brackets 49b, said screen making diameter separations between the suction apparatus and the disk separator which is primarily a length separation. The grain from the scalper screen 11 is fed onto the vibrating screen 49 and discharged at the lower end 50 thereof onto an endless conveyor 51 that delivers the grain to the hopper inlet 52 of the disk separator 17, the construction otherwise remaining the same.

From the above detailed description of the invention, it is believed that the construction and operation thereof will at once be apparent, it being noted that the main idea is to associate a disk separator with a double leg suction unit in lieu of or in combination with the customary screens usually combined with such suction apparatus, thus highly increasing efficiency in practically the same space and making portability practical. Aspirations are effected by the suction apparatus for the removal of foreign substances, while the disk separator effects separations by size of kernels so that barley, oats and similar seeds that might otherwise pass through the machine with the wheat are removed.

While there is herein shown and described the preferred embodiments of the invention, it is nevertheless to be understood that minor changes may be made therein without departing from the spirit and scope of the invention as claimed.

We claim:—

In a portable grain cleaning and treating machine, the combination with suction apparatus, of a disk separator associated with the suction apparatus with the grain aspirated by the suction apparatus before entering and after leaving the disk separator, and a vibrating screen interposed between the suction apparatus and disk separator, a mixing barrel receiving the grain from the separator, and means for metering a treating substance to the grain after discharge from the separator and prior to delivery into the tumbling barrel.

In testimony whereof we affix our signatures.

JOHN W. HOEFLING.
PHILIP M. HOEFLING.